(12) United States Patent
Wang et al.

(10) Patent No.: US 10,437,837 B2
(45) Date of Patent: Oct. 8, 2019

(54) GENERATING DESCRIPTIVE TOPIC LABELS

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

(*) Notice: Subject to any disclaimer, the term of this patent is extended or adjusted under 35 U.S.C. 154(b) by 579 days.

(21) Appl. No.: 14/880,087

(22) Filed: Oct. 9, 2015

(65) Prior Publication Data

US 2017/0103074 A1    Apr. 13, 2017

(51) Int. Cl.
  *G06F 16/2457* (2019.01)
  *G06F 16/93* (2019.01)
  *G06F 16/951* (2019.01)
  *G06F 16/31* (2019.01)

(52) U.S. Cl.
  CPC ...... *G06F 16/24578* (2019.01); *G06F 16/313* (2019.01); *G06F 16/93* (2019.01); *G06F 16/951* (2019.01)

(58) Field of Classification Search
  CPC .. G06F 17/3053; G06F 16/2457; G06F 16/93; G06F 16/951; G06F 16/31
  See application file for complete search history.

(56) References Cited

U.S. PATENT DOCUMENTS

| 9,760,634 | B1* | 9/2017 | Joshi | G06F 17/30864 |
| 2003/0078899 | A1* | 4/2003 | Shanahan | G06F 17/30707 706/8 |
| 2003/0078913 | A1* | 4/2003 | McGreevy | G06F 17/30395 |
| 2009/0313245 | A1* | 12/2009 | Weyl | G06F 17/30253 |
| 2011/0099133 | A1* | 4/2011 | Chang | G06F 17/30707 706/12 |
| 2013/0246430 | A1* | 9/2013 | Szucs | G06F 17/30011 707/738 |
| 2014/0325335 | A1* | 10/2014 | Paulik | G06F 17/2241 715/234 |

(Continued)

OTHER PUBLICATIONS

U.S. Appl. No. 14/796,978, filed Jul. 10, 2015.

(Continued)

*Primary Examiner* — Cam Y T Truong
(74) *Attorney, Agent, or Firm* — Maschoff Brennan (57) ABSTRACT

A method to generate a topic label for a set of electronic documents may include crawling, by a processor, the set of electronic documents. The method may include extracting knowledge points from the set of electronic documents. The method may also include selecting a candidate set of knowledge points from the plurality of knowledge points based on occurrence values. The method may include calculating relatedness scores between each knowledge point in the candidate set of knowledge points. The method may also include calculating hierarchical relationships between each knowledge point in the candidate set. The method may further include calculating comprehensive scores for each knowledge point in the candidate set based on the relatedness scores and the hierarchical relationships. The method may include selecting, from the set of knowledge points, a first candidate knowledge point with the highest comprehensive score as a topic label for the set of electronic documents.

14 Claims, 4 Drawing Sheets

(56) References Cited

U.S. PATENT DOCUMENTS

| | | | |
|---|---|---|---|
| 2015/0088910 A1* | 3/2015 | Misra | G06F 17/30719 |
| | | | 707/749 |
| 2015/0146991 A1* | 5/2015 | Nakano | G06K 9/00288 |
| | | | 382/219 |
| 2015/0356099 A1* | 12/2015 | Targonski | G06Q 50/16 |
| | | | 707/724 |
| 2016/0147891 A1* | 5/2016 | Chhichhia | G06F 17/30011 |
| | | | 707/734 |
| 2017/0025125 A1* | 1/2017 | Alvarez Guevara | G10L 15/02 |
| 2018/0018349 A1* | 1/2018 | Liu | G06F 17/2785 |

OTHER PUBLICATIONS

Q. Mei et al., Automatic labeling of multinomial topic models. KDD'07, ACM Aug. 12, 2007.
C. Carpineto et al., A survey of Web clustering engines. ACM Computing Surveys, vol. 41, No. 3, Article 17, Publication date: Jul. 2009.
Ruiji Fu et al., Learning semantic hierarchies via word embeddings. In Proceedings of the 52th Annual Meeting of the Association for Computational Linguistics: Long Papers-vol. 1, Baltimore MD, USA, Jun. 23, 2014.
M. Danilevsky et al., Automatic construction and ranking of topical keyphrases on collections of short documents. In SDM, 2014.

* cited by examiner

GENERATING DESCRIPTIVE TOPIC LABELS

FIELD

The embodiments discussed herein are related to generating descriptive topic labels.

BACKGROUND

A topic model is a type of statistical model for discovering the "topics" that may be represented in a corpus of documents.

The subject matter claimed herein is not limited to embodiments that solve any disadvantages or that operate only in environments such as those described above. Rather, this background is only provided to illustrate one example technology area where some embodiments described herein may be practiced. Further, unless otherwise indicated, the materials described in the background section are not prior art to the claims in the present application and are not admitted to be prior art by inclusion in this section.

SUMMARY

According to an aspect of an embodiment, a method to automatically generate descriptive topic labels is described in this application. The method may include crawling, by a processor, a set of electronic documents stored at least temporarily in a non-transitory storage media. The method may include extracting knowledge points from the set of electronic documents. The method may also include selecting a candidate set of knowledge points from the plurality of knowledge points based on occurrence values. The method may include calculating relatedness scores between each knowledge point in the candidate set of knowledge points. The method may also include calculating hierarchical relationships between each knowledge point in the candidate set. The method may further include calculating comprehensive scores for each knowledge point in the candidate set based on the relatedness scores and the hierarchical relationships. The method may include selecting, from the set of knowledge points, a first candidate knowledge point with the highest comprehensive score as a topic label for the set of electronic documents.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

The World Wide Web (Web) may be described as an ocean of information and knowledge. Through the Web and other advances in computer technologies, people may have greater access to information than ever before. However, much of the available information may be scattered around the Web and may not be well described or structured, which may result in significant problems in their use, search, organization and management. Thus, it may not be easy for individuals to locate and sort through the vast amount of information that may be available.

Some embodiments described in the present disclosure may be used to provide an effective approach to generate topic labels for a set of electronic documents. In some embodiments, a method to generate a topic label for a set of electronic documents may include crawling, by a processor, a set of electronic documents stored at least temporarily in a non-transitory storage media. The method may include extracting knowledge points from the set of electronic documents. The method may include calculating relatedness scores between each knowledge point in the candidate set of knowledge points. The method may also include calculating hierarchical relationships between each knowledge point in the candidate set of knowledge points. The method may further include calculating comprehensive scores for each knowledge point in the candidate set of knowledge points based on the relatedness scores and the hierarchical relationships. The method may include selecting, from the set of knowledge points, a first candidate knowledge point that has a highest comprehensive score as a topic label for the set of electronic documents.

The term "electronic documents," as used herein, may include any published article or electronic publication, such as in a scientific journal, conference, newspaper, book, blog, lecture notes, transcripts, webpage, or magazine. The electronic document may be peer-reviewed and may be available via a network, for example, the Internet. Electronic documents may be available in scientific literature databases. Some or all of the electronic documents may be organized into a group, which may be referred to as a "set of electronic documents."

Throughout the present disclosure, the term "knowledge point" is used to refer to "concepts" described in electronic documents. A knowledge point may correspond to key terms or phrases in the electronic documents. For example, an electronic document may pertain to machine learning. The knowledge points may correspond to and/or include technology terms discussed in the courses such as "neural networks", "statistical inference", "clustering", and "structural predictions." In some embodiments described in the present disclosure, knowledge points may be extracted from one or more electronic documents and some or all of the knowledge points may be selected as a candidate for a topic label for the set of electronic documents, as described herein.

Figure 1:
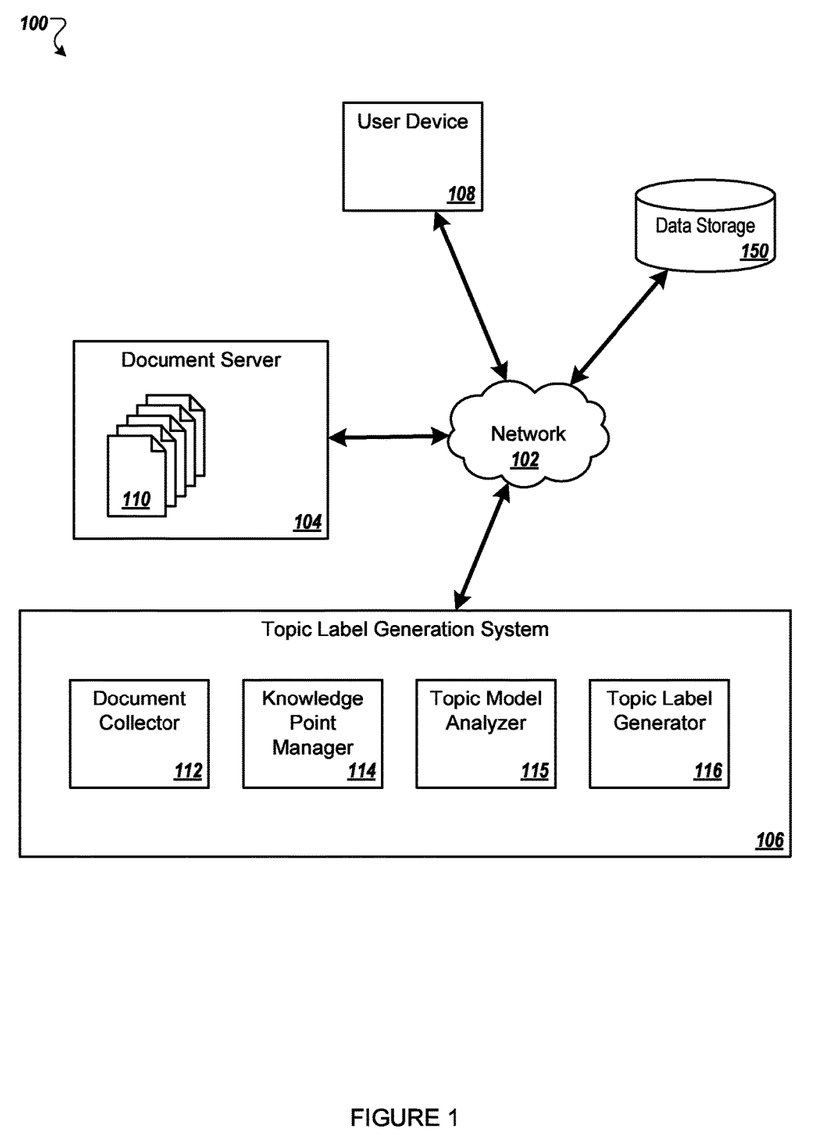
FIG. 1 is a block diagram of an example operating environment in which some embodiments may be implemented.

FIG. 1 illustrates a block diagram of an example operating environment 100 in which some embodiments may be implemented, arranged in accordance with at least one embodiment. The operating environment 100 may include a network 102, a document server 104, a topic label generation system (hereinafter "system") 106, a user device 108 and a data storage 150.

In general, the network 102 may include one or more wide area networks (WANs) and/or local area networks (LANs) that enable the system 106 and/or the user device 108 to access electronic documents 110 on the document server 104 and/or to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The example operating environment 100 may include any number of document servers 104 that each may host and/or store one or more electronic documents 110. The document server 104 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components.

The electronic documents 110 may include any of a variety of online resources such as webpages, weblogs ("blog"), books, e-books, articles, social media, open courseware (OCW) learning materials, massive open online courses (MOOC) learning materials, course pages for courses taught at educational institutions by individuals including professors and lecturers, lecture notes and/or recordings (e.g., video and/or audio recordings) associated with such courses, or the like or any combination thereof. The electronic documents 110 may include, for example, lecture notes, syllabi, videos, video transcripts, example problems/solutions, lecture slides, and other materials. A particular electronic document 110 may have one or more authors. The electronic documents 110 may be accessible on websites hosted by one or more corresponding web servers (e.g., document server 104) communicatively coupled to the Internet.

The user device 108 may include a computing device which may include, but is not limited to, a desktop computer, a laptop computer, a tablet computer, a mobile phone, a smartphone, a personal digital assistant (PDA), or other suitable computing device. A user may use the user device to find electronic documents 110 that satisfy or match a particular topic. Although not separately illustrated, the user device 108 typically communicates with the system 106 over network 102.

The system 106 may include a hardware server that includes a processor, a memory, and network communication capabilities. In the illustrated embodiment, the system 106 may be coupled to the network 102 to send and receive data to and from the user device 108 and/or the document server 104 via the network 102.

In at least one implementation, the data storage 150 may include a memory (e.g., random access memory), a cache, a drive (e.g., a hard drive), a flash drive, a database system, or another type of component or device capable of storing data. The data storage 150 may also include multiple storage components (e.g., multiple drives or multiple databases) that may span multiple computing devices (e.g., multiple server computers).

In general, the system 106 enables automated generation of topic labels for a set of electronic documents. The topic labels may provide comprehensive, concise and human-readable summary of topics discovered by topic model analysis from the electronic documents. The system 106 may be configured to extract knowledge points from the electronic documents 110. Based on the extracted knowledge points, the system 106 may automatically discover topics contained in the documents, and further generate a topic label for each discovered topic.

The system 106 may generate the topic labels without or with minimal action by an individual. For example, manual operations such as reading, evaluating, and relating the electronic documents 110 may be included in operations performed by the system 106. The system 106 may include a document collector 112, a knowledge point manager 114, a topic model analyzer 115, and a topic label generator 116. Each of the document collector 112, knowledge point manager 114, topic model analyzer 115, and topic label generator 116 may be implemented as software including one or more routines configured to perform one or more operations. The document collector 112, knowledge point manager 114, topic model analyzer 115, and topic label generator 116 may include a set of instructions executable by a processor to provide the functionality described herein. In some instances, the document collector 112, knowledge point manager 114, topic model analyzer 115, and topic label generator 116 may be stored in or at least temporarily loaded into a memory and may be accessible and executable by the processor. One or more of the document collector 112, knowledge point manager 114, topic model analyzer 115, and topic label generator 116 may be adapted for cooperation and communication with the processor and components of the system 106 via a bus (not shown in FIG. 1). Alternatively or additionally, one or more of the document collector 112, knowledge point manager 114, topic model analyzer 115, or topic label generator 116 may be implemented in hardware.

The document collector 112 may crawl the document server 104. Electronic documents may be stored on a single document server 104 or may be distributed among multiple document servers 104. In some embodiments, the document collector 112 may crawl the document server 104 in response to a request to create topic labels for topics discovered in a set of electronic documents. While crawling the document server 104, the document collector 112 may identify, scan, extract and copy content of the electronic documents 110. For example, the document collector 112 may perform operations performed by a web crawler, a web spider, an ant, an automatic indexer, a web scutter, or another suitable bot. The document collector 112 may copy pages or some data included therein that the document collector 112 visits and/or communicate information and data included in the electronic documents 110 to the system 106. The document collector 112 may store crawled information, including the electronic documents 110 themselves, in the data storage 150.

The knowledge point manager 114 may extract knowledge points from the electronic documents 110. The knowledge point manager 114 may receive segmented term sequences in electronic documents from the document collector 112. The knowledge point manager 114 may discover repeated phrase instances from the segmented term sequences. For example, the knowledge point manager 114 may process the segmented term sequences to derive knowledge points from the segmented term sequences. The repeated phrase instances may be quantified in a frequency for each of the segmented term sequences. The knowledge point manager 114 may identify the knowledge points for each electronic document in the set. The knowledge point manager 114 may identify a phrase (i.e., more than one word) as a knowledge point and may treat each identified knowledge point phrase as single unit. The knowledge point manager 114 may perform statistical analysis to automatically extract fine-granularity knowledge points without solely relying on precise linguistic analysis or manual input and/or selection by a user. The knowledge point manager 114 may also use any of the techniques described in U.S. patent application Ser. No. 14/796,838, entitled "Extraction of Knowledge Points and Relations From Learning Materials," filed on Jul. 10, 2015, the contents of which are incorporated by reference.

The topic model analyzer 115 may automatically discover a specific number (predetermined by human or auto-selected by algorithms) of topics from all documents in the set of electronic documents and may generate a representation of each topic discovered in the set of electronic documents. The topic model analyzer 115 may organize the set of electronic documents by topic. In doing so the topic model analyzer 115 may treat phrases or words that were extracted by the knowledge point manager 114 as a basic unit. In some embodiments, the representation of each topic may be determined in terms of a probability distribution over all vocabulary in the set of electronic documents, where vocabulary may refer to all single words and knowledge point phrases. A probability distribution over all vocabulary may be illustrated as a list of vocabulary and with their corresponding frequency.

The topic label generator 116 may be configured to analyze the representation of each topic discovered in the set of electronic documents by the topic model analyzer 115 to generate a topic label for a specific discovered topic. In some embodiments, the topic label generator 116 may select a subset of the knowledge points in a topic as candidates for use as the label for the topic. In some embodiments, in a topic representation candidate knowledge points with higher frequencies also more closely match the topic. The topic label generator 116 may select knowledge points with high frequency as candidate topic labels. Knowledge points above a frequency threshold value may be selected as candidate knowledge points. In some embodiments, the topic label generator 116 may generate a match score ("MS_KT") between each candidate knowledge point and the current topic. In some embodiments, each match score may be calculated based on a normalized geometric distance between the candidate knowledge point and the current topic. Knowledge points with match scores above the threshold match value may be selected as candidate knowledge points.

The topic label generator 116 may determine a distance between each candidate knowledge point. In some embodiments, the topic label generator 116 may generate a relatedness score ("AMS_KK") between each candidate knowledge point. For example, the topic label generator 116 may determine a distance between each candidate knowledge point based on average semantic similarity.

The topic label generator 116 may determine a hierarchical relationship between each candidate knowledge point. The hierarchical relationship may be based on a "is-a" pattern match in the set of electronic document, or a predefined hierarchy (e.g., an open education resource site or lecture notes structure analysis may include a hierarchy). Each candidate knowledge point may be assigned a hierarchical level score, D. In the hierarchy, broad (e.g., more general) knowledge points may be on higher levels of the hierarchy and narrow (e.g., more specific) knowledge points may be on lower levels of the hierarchy. For example, a broad knowledge point such as "machine learning" may on a first level of the hierarchy and a narrow knowledge point such as "supervised learning" and "unsupervised learning" associated with machine learning may be on a lower level of the hierarchy that is a sub-level of the first level.

The topic label generator 116 may calculate comprehensive scores for each candidate knowledge point. The comprehensive scores may be used to select the topic label for the set of electronic documents. The topic label generator 116 may use at least one of the match score between each candidate knowledge point and the current topic (MS_KT), the relatedness score between candidate knowledge points (e.g., AMS_KK), or an average thereof, and a hierarchical level score to generate the comprehensive score for each candidate knowledge point. An example equation for the comprehensive score may be represented as: $CS = a \times MS\_KT + b \times AMS\_KK + c \times \log(D)$, where CS is the comprehensive score, MS_KT is the match score between a candidate knowledge point and the current topic, AMS_KK is the relatedness score (or average relatedness score) between the candidate match points and D is the hierarchical level score. In some embodiments, the equation for determining the comprehensive score CS for each candidate knowledge point may include weighting factors, a, b, and c. The values of a, b, and c may be set and adjusted by a system administrator or estimated based on supervised learning with human-selected training data.

The topic label generator 116 may select a knowledge point with the highest comprehensive score CS and designate that selected knowledge point as the topic label for the set of electronic documents. The topic label generator 116 may output the selected knowledge point as the topic label for the set of electronic documents. For example, the system 106 may send the topic label to the user device 108 or may publish the topic label to a website that lists the topic label and the set of electronic documents (e.g., as hyperlinks). In some embodiments, the topic label generator 116 may determine whether the selected CS of the knowledge point is above a threshold CS value. The threshold CS value may be used to improve the quality of the selected topic label by disallowing selected knowledge points with low comprehensive scores from being output as the topic label for the set of electronic documents. The threshold CS value may be set by a system administrator. When the comprehensive score for the selected knowledge point is below the threshold CS value, the topic label generator 116 may output a message that a topic label was not generated. In some embodiments and in response to that message, a system administrator may use the knowledge points to manually select a topic label for the set of electronic documents.

Modifications, additions, or omissions may be made to the example operating environment 100 without departing from the scope of the present disclosure. Specifically, embodiments of the environment 100 are depicted in FIG. 1 as including one network 102, one user device 108, one system 106 and one data storage 150. However, the present disclosure applies to an environment 100 including one or more networks 102, one or more document servers 104, one or more user devices 108, one or more systems 106, one or more data storages 150, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

Figure 2:
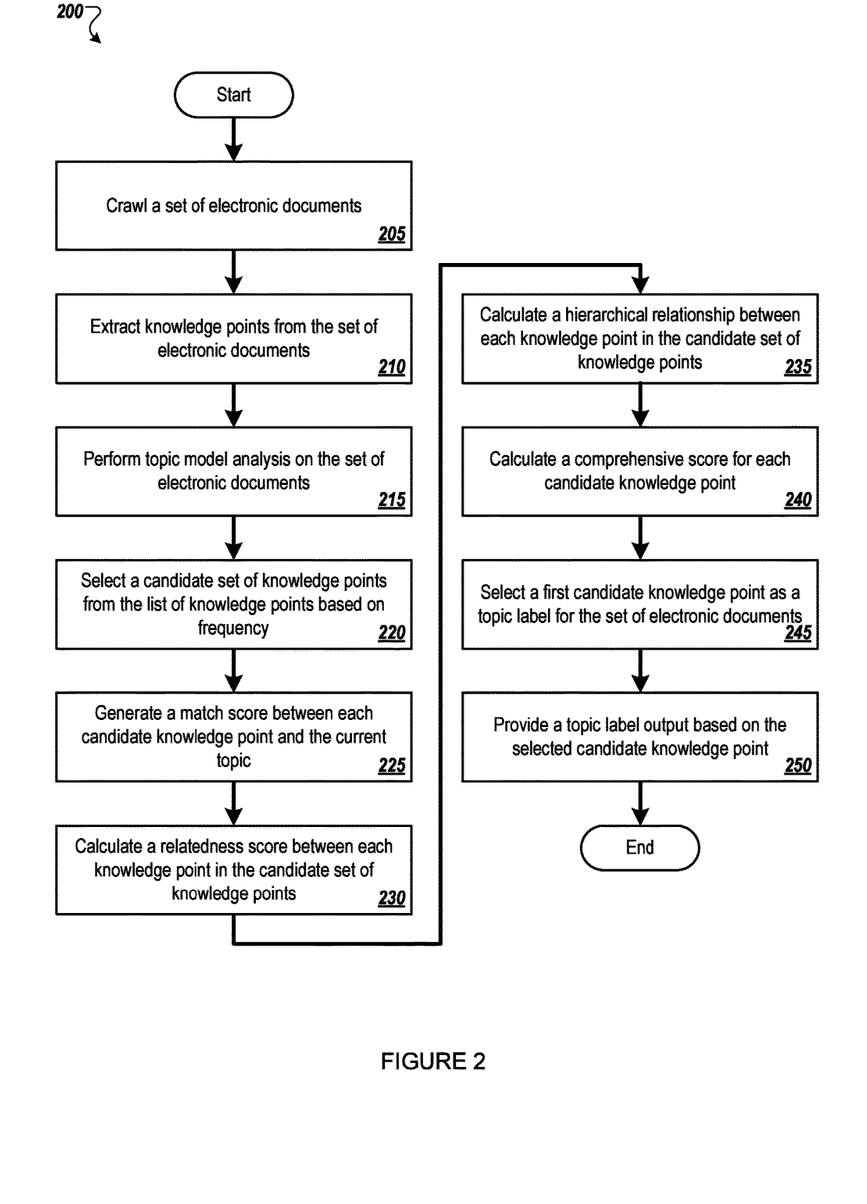
FIG. 2 illustrates an example flow diagram of a method to generate a topic label for a set of electronic documents that may be implemented in the operating environment of FIG. 1.
Figure 3:
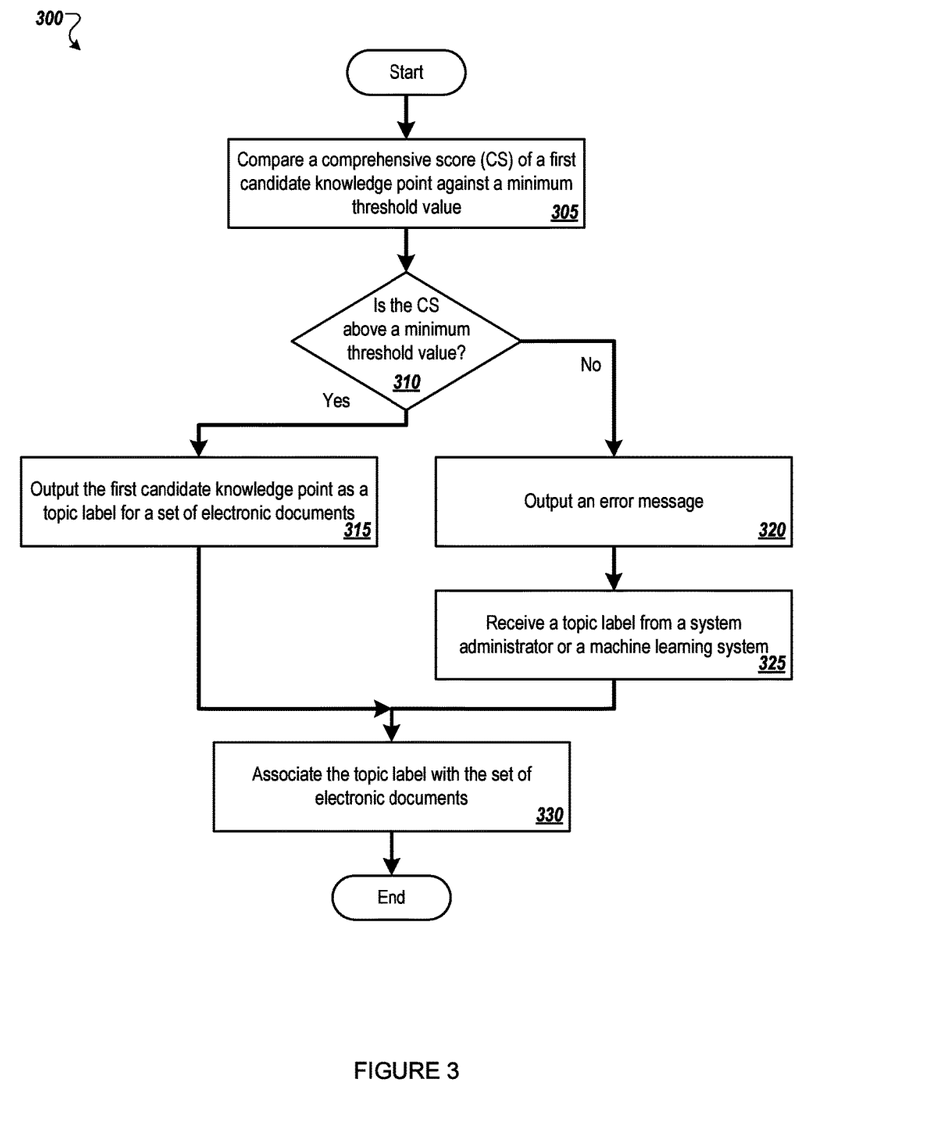
FIG. 3 illustrates an example flow diagram of a method to provide a topic label output based on a selected candidate knowledge point that may be implemented in the operating environment of FIG. 1.

FIGS. 2-3 are flow diagrams of various methods related to generating a topic label for a set of electronic documents. The methods may be performed by processing logic that may include hardware (circuitry, dedicated logic, etc.), software (such as is run on a general purpose computer system or a dedicated machine), or a combination of both, which processing logic may be included in the system 106 or another computer system or device. For simplicity of explanation, methods described herein are depicted and described as a series of acts. However, acts in accordance with this disclosure may occur in various orders and/or concurrently, and with other acts not presented and described herein. Further, not all illustrated acts may be required to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. The methods illustrated and described in conjunction with FIGS. 2-4 may be performed, for example, by a system such as the system 106 of FIG. 1. However, another system, or combination of systems, may be used to perform the methods. Although illustrated as discrete blocks, various blocks may be divided into additional blocks, combined into fewer blocks, or eliminated, depending on the desired implementation.

FIG. 2 illustrates an example flow diagram of a method 200 of generating a topic label for a set of electronic documents that may be implemented in the operating environment of FIG. 1, arranged in accordance with at least one embodiment described in the present disclosure.

The method 200 may begin at block 205, where the processing logic may crawl a set of electronic documents stored at least temporarily in a non-transitory storage medium. In some embodiments, the processing logic automatically crawls the set of electronic documents. In some embodiments, the processing logic may crawl the set of electronic documents in response to receiving a request to generate a topic label for topics discovered in the set of electronic documents.

At block 210, the processing logic may extract knowledge points from the set of electronic documents. The processing logic may discover a predetermined number of topics from the set of electronic documents. When extracting the knowledge points from the set of electronic documents, the processing logic may receive segmented term sequences in the electronic documents. The processing logic may discover repeated phrase instances of the segmented term sequences. The phrase instances may be limited by a predetermined maximum length. The processing logic may generate the knowledge points from the segmented term sequences.

At block 215, the processing logic may perform topic model analysis on the set of electronic documents. The processing logic may organize each electronic document in the set of electronic documents by topic. The processing logic may treat the phrases extracted from knowledge point extraction at block 215 as basic units. The processing logic may extract topic representation from the set of electronic documents, where the representation of each topic may be determined in terms of a probability distribution over all vocabulary in the set of electronic documents, where vocabulary may refer to all single words and knowledge point phrases.

At block 215, 220 processing logic may select a candidate set of knowledge points based on the frequency of each knowledge point in the set of electronic documents. For example, the processing logic may select the top five knowledge points as candidate topics based on frequency and/or distribution within the set of electronic documents.

At block 225, the processing logic may generate a match score between each knowledge point in the candidate set of knowledge points and the current topic. In some embodiments, candidate knowledge points with higher frequencies also more closely match the current topic. In some embodiments, the processing logic may generate a match score ("MS_KT") between each candidate knowledge point and the current topic. In some embodiments, each match score for each knowledge point in the current topic may be calculated based on a normalized geometric distance between the candidate knowledge point and the current topic.

At block 230, the processing logic may calculate relatedness scores between each knowledge point in the candidate set of knowledge points. At block 235, the processing logic may calculate hierarchical relationships between each knowledge point in the candidate set of knowledge points, such as by repeating blocks 215 through 230 for each topic.

At block 240, the processing logic may calculate a comprehensive score for each knowledge point in the candidate set of knowledge points based on one or more of the match scores, the relatedness scores, and the hierarchical relationships.

At block 245, the processing logic may select, from the set of knowledge points, a first candidate knowledge point that has a highest comprehensive score as a topic label for the set of electronic documents. In some embodiments, the selected first candidate knowledge point replaces the preliminary topic label. At block 250, the processing logic may provide a topic label output based on the selected candidate knowledge point, as further described in conjunction with FIG. 3.

For this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

FIG. 3 illustrates an example flow diagram of a method 300 of providing a topic label output based on a selected candidate knowledge point that may be implemented in the operating environment of FIG. 1, arranged in accordance with at least one embodiment described in the present disclosure. The method may begin at block 305. At block 305, processing logic may compare a first candidate knowledge point, which may have been selected as a topic label at block 250 of FIG. 2, against a minimum threshold CS value.

When the comprehensive score of the selected candidate knowledge point is above the minimum threshold CS value ("YES" at block 310), the processing logic at block 315 may output the first candidate knowledge point as the topic label output for a set of electronic documents. At block 330, the processing logic may associate the topic label with the set of electronic documents and may store the topic label for the set of electronic documents in a data storage.

When the comprehensive score of the selected candidate knowledge point is below the minimum threshold CS value ("NO" at block 310), the processing logic at block 320 may output an error message that may indicate an inconsistent topic label. A system administrator may receive the error message and may manually select a topic label for the set of electronic documents. In some embodiments, a machine learning system may receive the error message at which point the machine learning may use training materials to generate a topic label. At block 325, the processing logic may receive the selected topic label from the system administrator or from the machine learning system. At block 330, the processing logic may associate the topic label with the set of electronic documents as described above.

Figure 4:
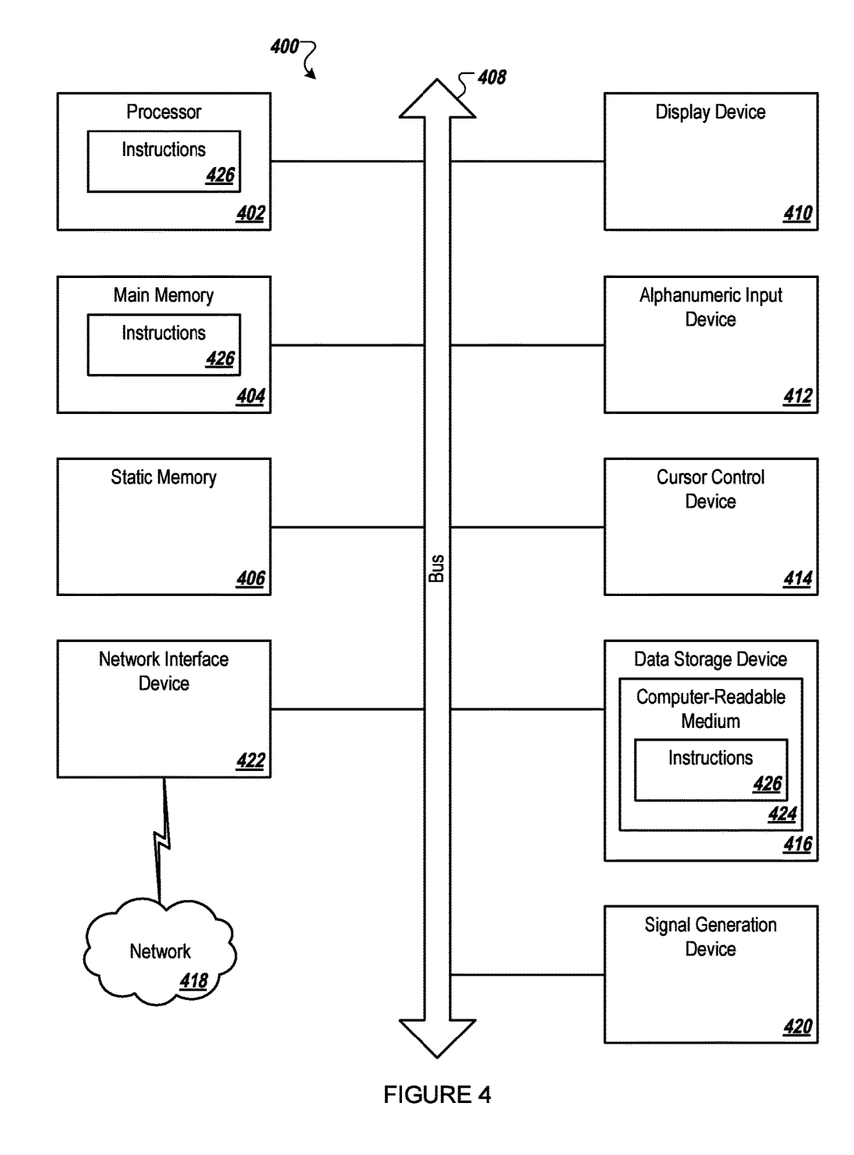
FIG. 4 illustrates a diagrammatic representation of a machine in the example form of a computing device within which a set of instructions, for causing the machine to perform any one or more of the methodologies discussed herein, may be executed.

FIG. 4 illustrates a diagrammatic representation of a machine in the example form of a computing device 400 within which a set of instructions, for causing the machine to perform any one or more of the methodologies discussed herein, may be executed. The computing device 400 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methodologies discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 also may include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In one implementation, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 (e.g., system 106) embodying any one or more of the methodologies or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 426 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methodologies of the present disclosure. The term "computer-readable storage medium" may accordingly be taken to include, but not be limited to, solid-state memories, optical media and magnetic media.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:
   crawling, by a computer having a processor, a set of electronic documents stored at least temporarily in a non-transitory storage media;
   extracting, by the computer, a plurality of knowledge points from the set of electronic documents stored in memory;
   selecting, by the computer, a candidate set of knowledge points from the plurality of knowledge points by:
   generating a match score between each knowledge point in the candidate set of knowledge points and a current topic based on a normalized geometric distance between the knowledge point and the current topic;
   selecting knowledge points with match scores above threshold match value for inclusion in the candidate set of knowledge points;
   calculating, by the computer, relatedness scores between each knowledge point in the candidate set of knowledge points;
   calculating, by the computer, hierarchical relationships between each knowledge point in the candidate set of knowledge points;
   calculating, by the computer, comprehensive scores for each knowledge point in the candidate set of knowledge points based on the relatedness scores and the hierarchical relationships;
   selecting, by the computer from the set of candidate knowledge points, a first candidate knowledge point that has a highest comprehensive score as a topic label for the set of electronic documents, wherein the selecting the first candidate knowledge point comprises replacing a preliminary topic label with the first candidate knowledge point;
   setting, by a processing logic executed on the computer, the first candidate knowledge point as the topic label for the set of electronic documents; and
   providing, by the processing logic executed on the computer, a topic label output based on the selected candidate knowledge point, wherein the providing the topic label output based on the selected candidate knowledge point comprises:
   comparing, by the processing logic executed on the computer, the highest comprehensive score of the first candidate knowledge point against a minimum threshold value; and
   outputting, by the processing logic executed on the computer to a machine learning system of the computer, the first candidate knowledge point as the topic label for the set of electronic documents in response to the highest comprehensive score of the first candidate knowledge point being above the minimum threshold value.

2. The method of claim 1, wherein the set of electronic documents includes an electronic document hosted by a web server.

3. The method of claim 1, wherein each extracted knowledge point includes a word or a phrase that exists at least once in the set of electronic documents.

4. The method of claim 1, wherein extracting knowledge points from the set of electronic documents comprises:

receiving segmented term sequences in the set of electronic documents; discovering repeated phrase instances of the segmented term sequences, wherein the phrase instances are limited by a predetermined maximum length; and generating the knowledge points from the segmented term sequences.

5. The method of claim 1 wherein calculating the relatedness scores between each knowledge point in the candidate set of knowledge points comprises generating a probability distribution over the set of knowledge points for the set of electronic documents.

6. The method of claim 1 further comprising generating a match score between each knowledge point in the candidate set of knowledge points and the preliminary topic label, wherein the comprehensive scores are calculated based on the relatedness scores, the hierarchical relationships and the match scores.

7. The method of claim 1, wherein calculating the relatedness scores between each knowledge point in the candidate set of knowledge points comprises determining an average semantic similarity between each knowledge point of the knowledge points in the candidate set of knowledge points.

8. A non-transitory computer-readable medium having encoded therein programming code executable by a processor to perform or control performance of operations comprising:

crawling, by the processor, a set of electronic documents stored at least temporarily in a non-transitory storage media;

extracting, by the processor, a plurality of knowledge points from the set of electronic documents;

selecting, by the processor, a candidate set of knowledge points from the plurality of knowledge points by:

generating a match score between each knowledge point in the candidate set of knowledge points and a current topic based on a normalized geometric distance between the knowledge point and the current topic;

selecting knowledge points with match scores above the threshold match value for inclusion in the candidate set of knowledge points;

calculating, by the processor, relatedness scores between each knowledge point in the candidate set of knowledge points;

calculating, by the processor, hierarchical relationships between each knowledge point in the candidate set of knowledge points;

calculating, by the processor, comprehensive scores for each knowledge point in the candidate set of knowledge points based on the relatedness scores and the hierarchical relationships;

selecting, by the processor from the set of candidate knowledge points, a first candidate knowledge point that has a highest comprehensive score as a topic label for the set of electronic documents, wherein the selecting the first candidate knowledge point comprises replacing a preliminary topic label with the first candidate knowledge point;

setting the first candidate knowledge point as the topic label for the set of electronic documents;

providing a topic label output based on the selected candidate knowledge point, wherein the providing the topic label output based on the selected candidate knowledge point comprises:

comparing the highest comprehensive score of the first candidate knowledge point against a minimum threshold value; and outputting, to a machine learning system of a computer, the first candidate knowledge point as the topic label for the set of electronic documents in response to the highest comprehensive score of the first candidate knowledge point being above the minimum threshold value.

9. The non-transitory computer-readable medium of claim 8, wherein the set of electronic documents includes an electronic document hosted by a web server.

10. The non-transitory computer-readable medium of claim 8, wherein each extracted knowledge point includes a word or a phrase that exists at least once in the set of electronic documents.

11. The non-transitory computer-readable medium of claim 8, wherein extracting knowledge points from the set of electronic documents comprises:

receiving segmented term sequences in the set of electronic documents; and discovering repeated phrase instances of the segmented term sequences, wherein the phrase instances are limited by a predetermined maximum length; and generating the knowledge points from the segmented term sequences.

12. The non-transitory computer-readable medium of claim 8 wherein calculating the relatedness scores between each knowledge point in the candidate set of knowledge points comprises generating a probability distribution over the knowledge points for the set of electronic documents.

13. The non-transitory computer-readable medium of claim 8 further comprising generating a match score between each knowledge point in the candidate set of knowledge points and the preliminary topic label, wherein the comprehensive scores are calculated based on the relatedness scores, the hierarchical relationships and the match scores.

14. The non-transitory computer-readable medium of claim 8, wherein calculating the relatedness scores between each knowledge point in the candidate set of knowledge points comprises determining an average semantic similarity between each knowledge point of the knowledge points in the candidate set of knowledge points.

* * * * *